(12) United States Patent
Matsumoto et al.

(10) Patent No.: US 10,955,034 B2
(45) Date of Patent: Mar. 23, 2021

(54) ROLLING GUIDE APPARATUS

(71) Applicant: NSK Ltd., Tokyo (JP)

(72) Inventors: Jun Matsumoto, Kanagawa (JP); Keisuke Matsumura, Kanagawa (JP)

(73) Assignee: NSK LTD., Tokyo (JP)

( * ) Notice: Subject to any disclaimer, the term of this patent is extended or adjusted under 35 U.S.C. 154(b) by 57 days.

(21) Appl. No.: 15/568,472

(22) PCT Filed: May 16, 2016

(86) PCT No.: PCT/JP2016/064419
§ 371 (c)(1),
(2) Date: Oct. 21, 2017

(87) PCT Pub. No.: WO2016/190147
PCT Pub. Date: Dec. 1, 2016

(65) Prior Publication Data
US 2018/0112707 A1      Apr. 26, 2018

(30) Foreign Application Priority Data

May 22, 2015   (JP) .............................. JP2015-104256
Nov. 16, 2015  (JP) .............................. JP2015-224063

(51) Int. Cl.
*F16H 25/22*     (2006.01)
*F16C 33/32*     (2006.01)
(Continued)

(52) U.S. Cl.
CPC ......... *F16H 25/2209* (2013.01); *F16C 29/06* (2013.01); *F16C 29/0638* (2013.01);
(Continued)

(58) Field of Classification Search
CPC .............. F16C 29/0638; F16C 29/0645; F16C 29/0647; F16C 29/0685; F16C 29/0695;
(Continued)

(56) References Cited

U.S. PATENT DOCUMENTS 975,616 A    11/1910  Hess
3,813,135 A   5/1974  Martinie
(Continued)

FOREIGN PATENT DOCUMENTS

JP    1966-000443 B1    1/1966
JP    1973-057035 A     8/1973
(Continued)

OTHER PUBLICATIONS

International Search Report from International Patent Application No. PCT/JP2016/064419, dated Aug. 16, 2016.
(Continued)

*Primary Examiner* — Joseph Brown
(74) *Attorney, Agent, or Firm* — SGPatents PLLC

(57) ABSTRACT

A rolling guide apparatus having a first member 1, a second member 2, and a rolling body unit 5, the apparatus including a guide path G of the rolling body unit 5 including a rolling path R configured to have a rolling groove 1a and a rolling groove 3a, and a circulation path C allowing communication between a start point and an end point of the rolling path R, the rolling body unit 5 being configured to have a plurality of first rolling bodies 5a and a plurality of second rolling bodies 5b each composed of an elastic material, at least one second rolling body 5b being always positioned in the circulation path C. The rolling guide apparatus is easy to be assembled and is capable of performing stable operations.

12 Claims, 17 Drawing Sheets

(51) Int. Cl.
*F16C 33/374* (2006.01)
*F16C 33/37* (2006.01)
*F16C 29/06* (2006.01)

(52) U.S. Cl.
CPC .......... *F16C 29/0695* (2013.01); *F16C 33/32* (2013.01); *F16C 33/374* (2013.01); *F16C 33/3713* (2013.01); *F16H 25/22* (2013.01); *F16H 25/2204* (2013.01); *F16H 25/2219* (2013.01); *F16C 29/0647* (2013.01)

(58) Field of Classification Search
CPC ........ F16C 33/32; F16C 33/37; F16C 33/374; F16H 25/2209; F16H 25/22; F16H 25/2204; F16H 25/2238
USPC ...... 74/424.83, 89.23, 424.82; 384/491, 492, 384/521, 535, 536
See application file for complete search history.

(56) References Cited

U.S. PATENT DOCUMENTS

| | | | |
|---|---|---|---|
| 4,317,600 A | 3/1982 | Li | |
| 5,377,552 A * | 1/1995 | Kley | F16C 33/3713 73/862.49 |
| 5,615,955 A * | 4/1997 | Namimatsu | F16C 33/3713 384/13 |
| 6,023,991 A * | 2/2000 | Yabe | F16H 25/2418 74/89.44 |
| 6,113,274 A * | 9/2000 | Horimoto | F16C 29/0645 384/43 |
| 6,352,366 B1 * | 3/2002 | Schneeberger | F16C 29/0602 384/13 |
| 6,663,290 B1 * | 12/2003 | Schepis | F16C 33/32 384/491 |
| 2002/0067874 A1 * | 6/2002 | Beaman | B62D 1/16 384/521 |
| 2004/0223670 A1 * | 11/2004 | Ramonat | F16C 19/505 384/45 |
| 2005/0105838 A1 | 5/2005 | Brauer | |
| 2005/0175264 A1 * | 8/2005 | Kim | F16C 29/0685 384/51 |

FOREIGN PATENT DOCUMENTS

| | | |
|---|---|---|
| JP | 1975-061232 U | 6/1975 |
| JP | 1982-165162 U | 10/1982 |
| JP | H08-061364 A | 3/1996 |
| JP | 2000-314420 A | 11/2000 |
| JP | 2004-084826 A | 3/2004 |
| JP | 2006-064123 A | 3/2006 |
| JP | 2009-121554 A | 6/2009 |
| JP | 2015-137707 A | 7/2015 |

OTHER PUBLICATIONS

Extended European Search Report for European Patent Application No. 16799853.3, dated Dec. 6, 2018.

* cited by examiner

ROLLING GUIDE APPARATUS

TECHNICAL FIELD

The present invention pertains to a rolling guide apparatus.

BACKGROUND ART

Known hitherto as rolling guide apparatuses are a linear motion guide apparatus, i.e., a linear motion guide apparatus including a linear guide rail, a curvilinear motion guide apparatus including a curvilinear guide rail, and a ball screw apparatus.

In the rolling guide apparatuses, e.g., the linear motion guide apparatus is equipped with a rolling path of a rolling body unit, which is configured to include a rolling groove formed in the guide rail and another rolling groove formed in a slider body, and a circulation path for connecting both ends of the rolling path to circulate the rolling body unit. The circulation path is configured to include a linear portion (return path) provided on the slider body, and a curvilinear portion (change-of-direction path) provided on an end cap.

In this type of linear motion guide apparatus, a moving quantity of the rolling body unit (which is termed an "entrance-side rolling body unit") entering the circulation path from the rolling path is not necessarily the same as a moving quantity of the rolling body unit (which is termed an "exit-side rolling body unit") exiting the rolling path from the circulation path due to influence of the curvilinear portion of the circulation path when running the slider. For example, when the moving quantities of the entrance-side rolling body units exceed the moving quantities of the exit-side rolling body units, the rolling body units get into an over-congested state within the circulation path, with the result that the exit-side rolling body units losing an escaping place due to jostling of the rolling body units against each other advance to the rolling path while sliding on the circulation path. At this time, frictional force abruptly augments, resulting in an apprehension of causing a malfunction and a failure of the linear motion guide apparatus because of damaging the circulation path and the rolling body units.

Under such circumstances, a linear motion guide apparatus is proposed, which is configured by alternately arranging the rolling body units and spacers in the rolling path and the circulation path. For what is described above, refer to, e.g., Japanese Patent Application Laid-Open Publication No. 2000-314420.

DOCUMENTS OF PRIOR ARTS

Patent Documents

Patent Document 1: Japanese Patent Application Laid-Open Publication No. 2000-314420

SUMMARY OF THE INVENTION

Problems to be Solved by the Invention

In the conventional linear motion guide apparatus described above, the spacer takes a substantially disc shape or a substantially square pole shape, and hence, when gaps occur between the rolling path and the circulation path and between rolling body unit and the spacer, the spacer falls down, with the result that the linear motion guide apparatus is locked in operation. Therefore, this disadvantage entails adjusting intervals between the rolling body units and the spacers when assembled, and, in addition, alternately arranging the rolling body units and the spacers so as to prevent the spacers from falling down, and this arranging operation is intricate, resulting in an inferior assembling property.

Such being the case, it is an object of the present invention, which is devised in view of the problems described above, to provide a rolling guide apparatus that is easy to be assembled and capable of performing stable operations.

Means for Solving the Problems

To solve the problems described above, the present invention provides a rolling guide apparatus having a first member, a second member and a rolling body unit being disposed between the first member and the second member, the second member being movable along the first member upon rolling of the rolling body unit, the apparatus including: a rolling body unit guide path being configured to include: a rolling path being configured to have a rolling groove formed in the first member and a rolling groove, formed in the second member, in a face-to-face relationship with the rolling groove of the first member; and a circulation path being provided in the second member and allowing communication between a start point and an end point of the rolling path, the rolling body unit being configured to include a plurality of first rolling bodies and a plurality of second rolling bodies each composed of an elastic material, at least one second rolling body being always positioned in the circulation path.

Effect of the Invention

According to the present invention, it is feasible to provide the rolling guide apparatus that is easy to be assembled and capable of performing the stable operations.

EMBODIMENTS FOR CARRYING OUT THE INVENTION

A rolling guide apparatus according each of embodiments of the present invention will hereinafter be described based on the accompanying drawings.

First Embodiment

Figure 1A:
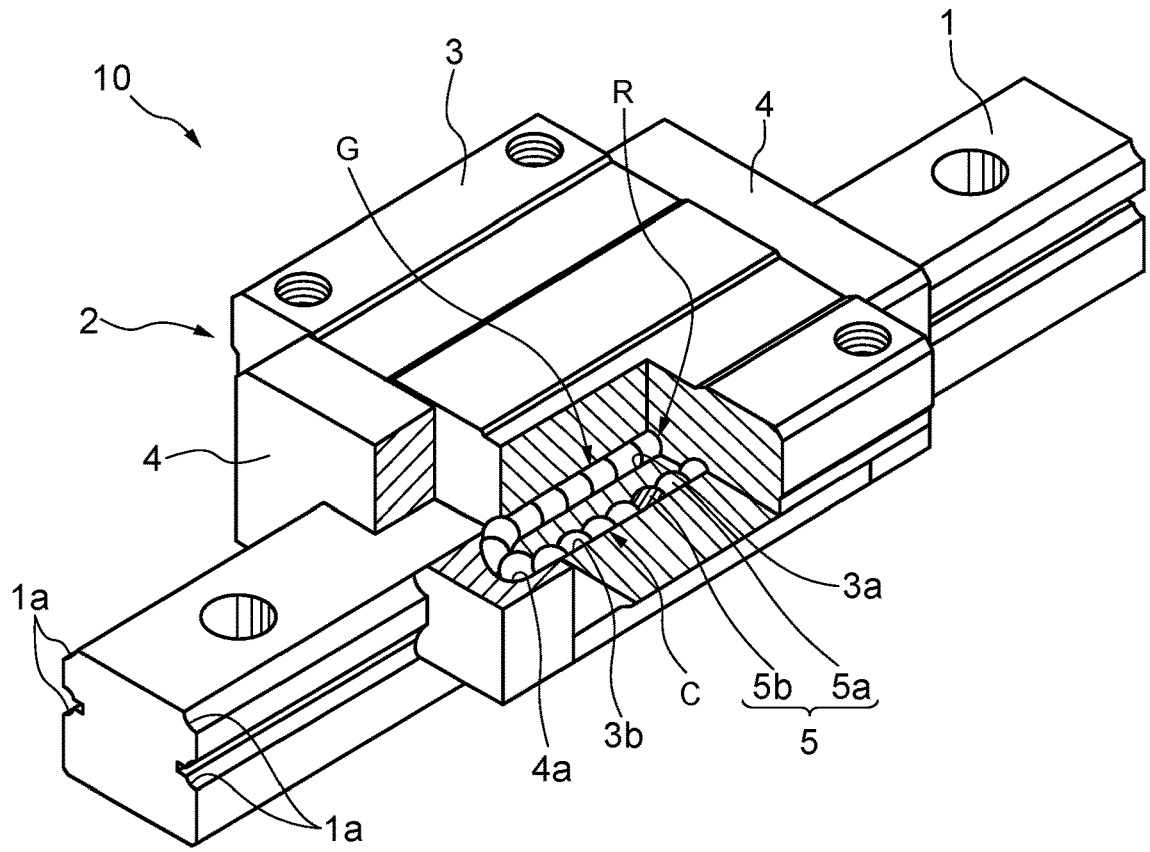
FIG. 1A is a view illustrating a linear motion guide apparatus defined as a rolling guide apparatus according to a first embodiment.

A linear motion guide apparatus 10 defined as a rolling guide apparatus according to a first embodiment illustrated in FIG. 1A is used for a tooling machine, a conveying apparatus and other production facilities, and is configured to include a linear guide rail 1 and a slider 2 movable along the guide rail 1.

The guide rail 1 is composed of a metallic member taking a substantially square pole shape, and includes rolling grooves 1a formed by twos in both of side surfaces and extending in a longitudinal direction.

The slider 2 is configured to include a slider body 3 and end caps 4 fitted to both of end portions of the slider body 3 in the longitudinal direction. The slider body 3 is composed of a metallic member extending in the longitudinal direction of the guide rail 1 and taking a substantially C-shape in section, and is fitted to the guide rail 1 in a way that straddles the guide rail 1. The slider body 3 includes rolling grooves 3a formed by twos in portions having a face-to-face relationship with both of the side surfaces of the guide rail 1, i.e., in internal side surfaces of leg portions on both sides, and extending in the longitudinal direction in the face-to-face relationship with the rolling grooves 1a of the guide rail 1. The rolling grooves of the slider body 3 and the rolling grooves 1a of the guide rail 1 are combined to configure a rolling path R for rolling bodies 5. Linear return paths 3b penetrating the slider body 3 in the longitudinal direction are so formed by twos in both of the leg portions of the slider body 3 as to be parallel with the rolling grooves 3a.

Figure 1B:
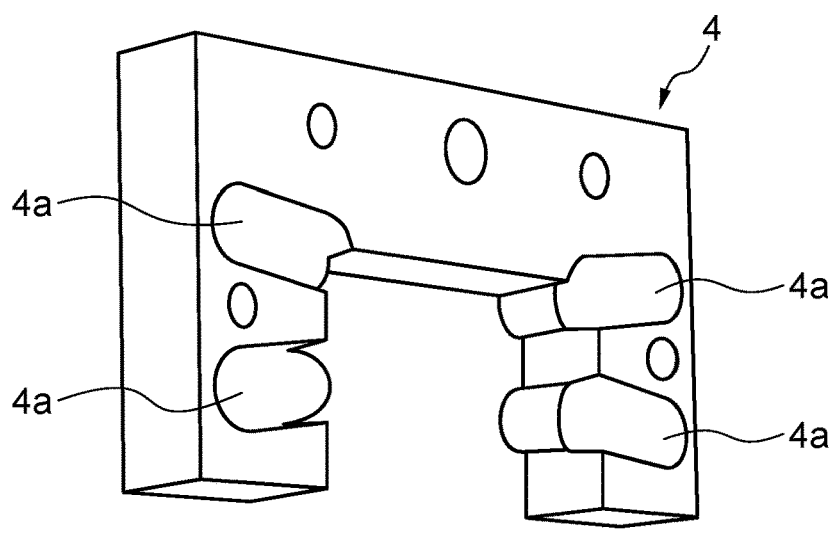
FIG. 1B is a view illustrating a configuration of end caps.
Figure 2:
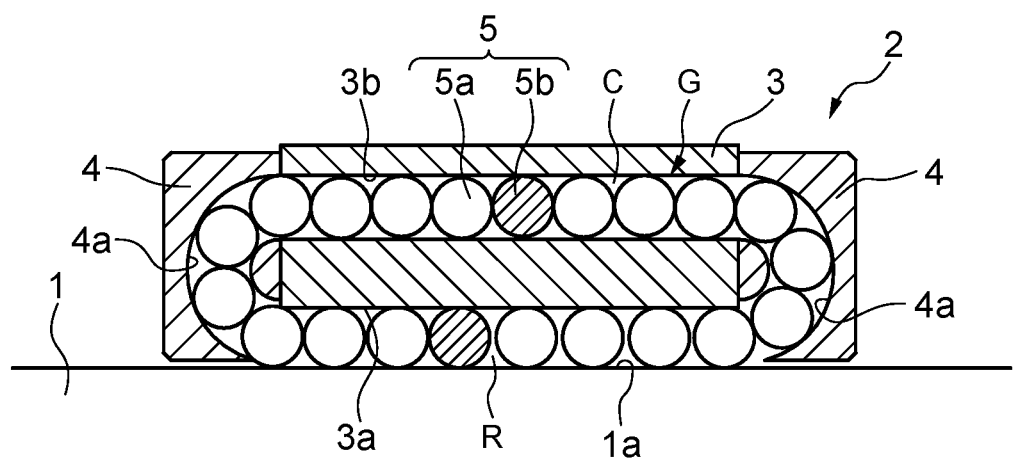
FIG. 2 is a view illustrating a rolling body unit in the linear motion guide apparatus according to the first embodiment.

The end cap 4 is composed of a resinous member taking a substantially C-like shape. As illustrated also in FIG. 1B, a surface, on the side of the slider body 3, of the end cap 4 is formed with change-of-direction paths 4a by twos in both of the leg portions. The change-of-direction path 4a taking a semi-circular arc shape, as depicted in FIGS. 1A and 2, serves to allow the return path to communicate with the rolling path R. Note that the end cap 4 may also be composed of a metal without being limited to the resin. The return path 3b of the slider body 3 and the change-of-direction path 4a of the end cap 4 configure a circulation path C for circulating the rolling bodies 5 through the rolling path R. It is to be noted that the return path 3b of the slider body 3 is also said to be a linear portion of the circulation path C, while the change-of-direction path 4a of the end cap 4 is also said to be a curvilinear portion of the circulation path C.

The circulation path C and the rolling path R are in combination referred to as a guide path G. A multiplicity of load balls 5a and a plurality of elastic balls 5b are loaded as the rolling bodies 5 into the guide path G.

With the configuration described above, the rolling bodies 5 roll along the rolling path R, and the slider 2 is thereby enabled to perform a linear motion on the guide rail 1. Note that the rolling bodies 5 rolling within the rolling path R are guided again to the rolling path R via the circulation path C, and are thus enabled to circulate through the rolling path R and the circulation path C.

Herein, the load ball 5a of the rolling body 5 receives a load due to an external load and a preload that are applied to the linear motion guide apparatus 10 in the rolling path R, and is composed of a spherical metallic member. A material of the load ball 5a may also be ceramic and other equivalent materials without being limited to the metal.

The elastic ball 5b of the rolling body 5 serves to absorb force generated by the load balls 5a jostling against each other within the guide path G, and is composed of a resinous member taking a spherical shape. It may be sufficient that a material of the elastic ball 5b is an elastic material being softer and more elastically deformable than the load ball 5a. It is preferable that hardness of the material of the elastic ball 5b is 40-99 in Shore A hardness. The elastic material entails having an oil resistance, a heat resistance and a chemical resistance, depending on applications of the linear motion guide apparatus 10. For example, nitrile rubber (having the Shore A hardness that is 50-70, a tensile strength that is 4.4-12.7 MPa, and an elongation that is 370-440%) may be employed when the rubber needs the oil resistance; and fluoro rubber (having the Shore A hardness that is 60-80, the tensile strength that is 10.8-12.5 MPa, and the elongation that is 270-330%) may be used when the rubber needs the heat resistance. A diameter of the elastic ball 5b is designed to be slightly smaller than a diameter of the load ball 5*a*. This design enables the load ball 5*a* and the elastic ball 5*b* to smoothly roll along the guide path G. Note that the material of the elastic ball 5*b* may involve using plastic materials instanced by synthetic rubber (e.g., hydrogenated nitrile rubber) and elastomer (e.g., polyester-based elastomer, polyolefin-based elastomer, polyurethane-based elastomer). A quantity of elastic deformation of the elastic ball 5*b* may be adjusted by selecting the hardness of the material.

In the first embodiment, the load balls 5*a* and the elastic ball 5*b* are loaded in the guide path G so that at least one elastic ball 5*b* is, as illustrated in FIG. 2, always positioned in the circulation path C. To be specific, one elastic ball 5*b* is loaded for every nine or ten load balls 5*a*, thereby disposing the two elastic balls 5*b* at substantially equal intervals. With this arrangement, it follows that one elastic ball 5*b* always exists in the circulation path C while the slider 2 keeps running.

Figure 5A:
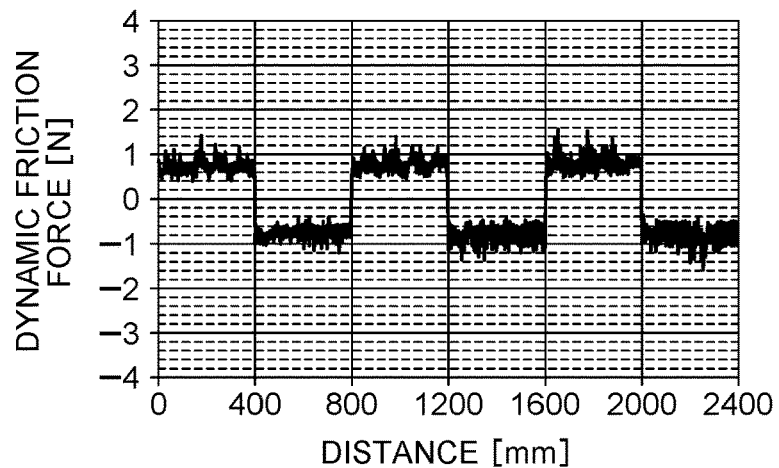
FIG. 5A is a view of the linear motion guide apparatus according to the first embodiment.

With this configuration, the slider 2 runs on the guide rail 1, on which occasion even when a moving quantity of the ball (termed an "entrance side ball") entering, e.g., the circulation path C from the rolling path R as in the prior art described above exceeds a moving quantity of the ball (termed an "exit side ball") exiting the rolling path R from the circulation path C, the elastic deformation of the elastic ball 5*b* enables obviation of the jostling of the load balls 5*a* against each other within the circulation path C. It is therefore feasible to eliminate abrupt generation of frictional force and to restrain fluctuations of the frictional force because of the exit side ball not advancing to the rolling path R while sliding on the circulation path C. For what is described above, refer to FIG. 5A. Accordingly, there is no apprehension about causing a malfunction and a failure of the linear motion guide apparatus 10 due to damages to the circulation path C and the load ball 5*a*.

In the first embodiment, it does not happen that the spherical elastic ball 5*b* falls down as the disc-shaped spacer according to the prior art described above does. It therefore does not happen that the linear motion guide apparatus 10 is locked in operation. There is neither necessity for an adjustment of the interval between the load ball 5*a* and the elastic ball 5*b* nor necessity for an intricate operation of arranging the rolling bodies and the spacers alternately so as not to cause the spacer to fall down as in the prior art, thereby providing a high assembling property. The spherical elastic ball 5*b* has a larger quantity of deformation than the disc-shaped spacer has, and it is therefore feasible to restrain the above-mentioned abrupt generation of the frictional force and the fluctuations of the frictional force more preferably.

In the first embodiment, the elastic balls 5*b* are disposed at the substantially equal intervals in the guide path G, thereby enabling a number of the elastic balls 5*b* to be restrained at the minimum. This further facilitates an operation of loading the load balls 5*a* and the load balls 5*a* into the guide path G, and enables a cost for the elastic balls 5*b* to be restrained. On the other hand, the maximum number of load balls 5*a* can be ensured, thereby enabling a load capacity and rigidity of the linear motion guide apparatus 10 to be ensured at the maximum.

It is to be noted that the first embodiment demonstrates the linear motion guide apparatus 10 with one elastic ball 5*b* being always positioned in the circulation path C as described above. However, the linear motion guide apparatus may be configured to, without being limited to this configuration, include two or more elastic balls that are always positioned in the circulation path, corresponding to the number and other equivalent attributes of the load balls.

Second Embodiment

Figure 3:
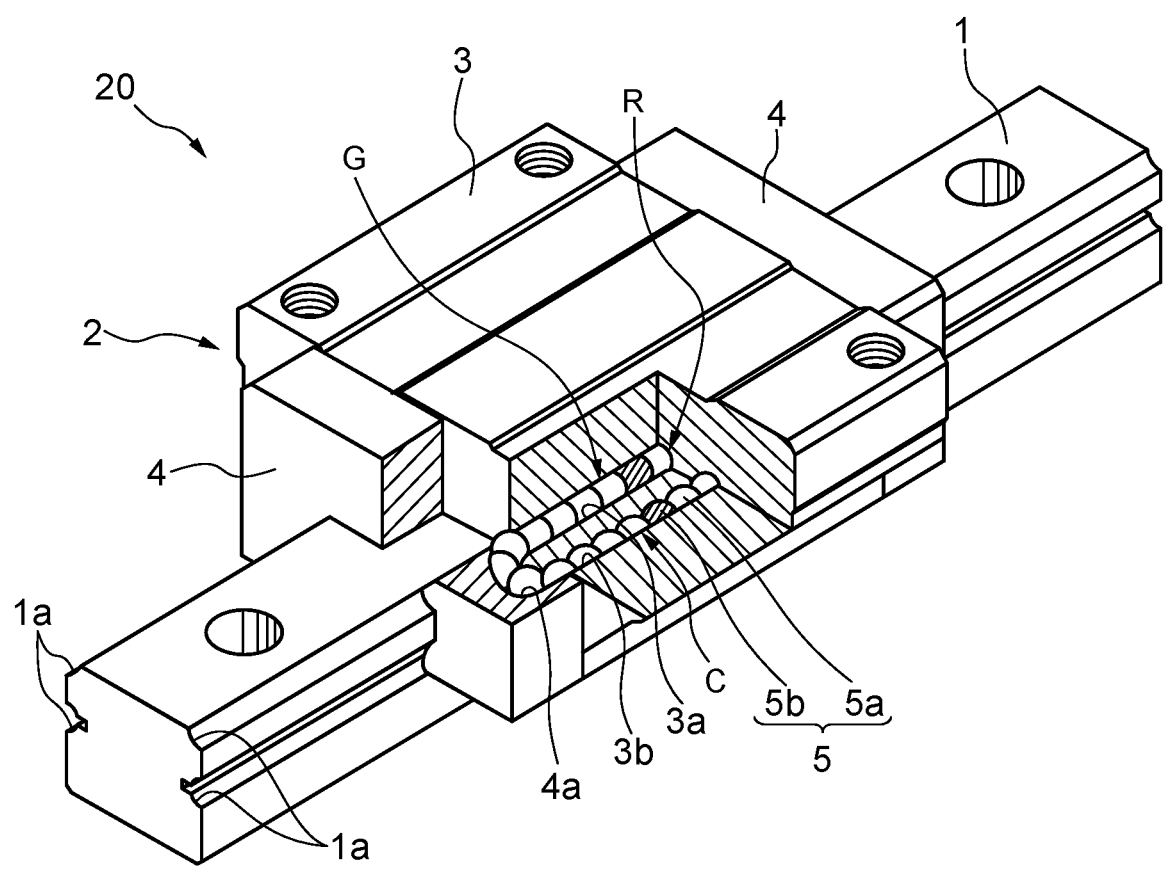
FIG. 3 is a view illustrating the linear motion guide apparatus defined as the rolling guide apparatus according to a second embodiment
Figure 4:
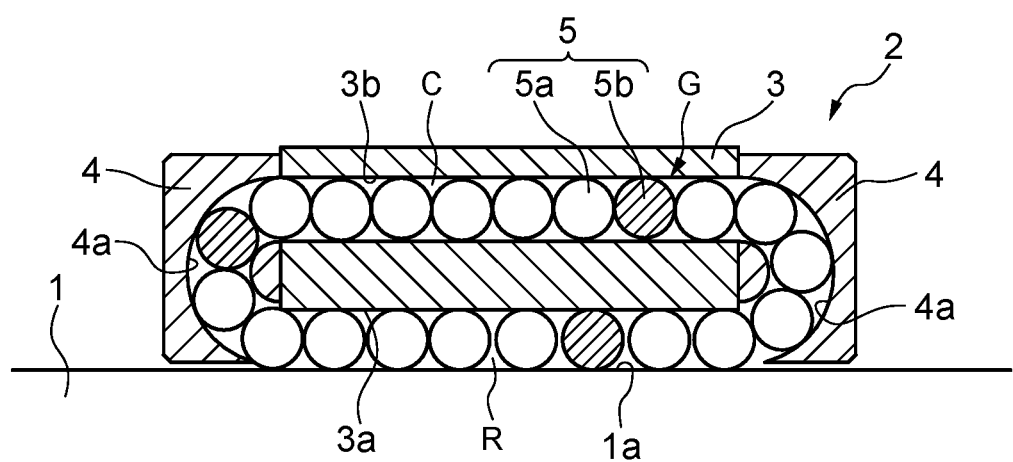
FIG. 4 is a view illustrating the rolling body unit in the linear motion guide apparatus according to the second embodiment.

An in-depth description of a linear motion guide apparatus 20 defined as a rolling guide apparatus according to a second embodiment illustrated in FIG. 3, will hereinafter be made in terms of different components from those of the first embodiment, while omitting their repetitive explanations by marking the same components as those of the first embodiment with the same reference numerals and symbols.

Herein, as described in the first embodiment, the load balls 5*a* get into an over-congested state within the circulation path C, in which case pressing force caused by the load balls 5*a* jostling against each other and received by the elastic ball 5*b* from the adjacent load ball 5*a*, is applied to the elastic ball 5*b* more efficiently in a direction closer to an advancing direction of the rolling body 5, whereby the elastic ball 5*b* can effectively absorb the pressing force.

Figure 5B:
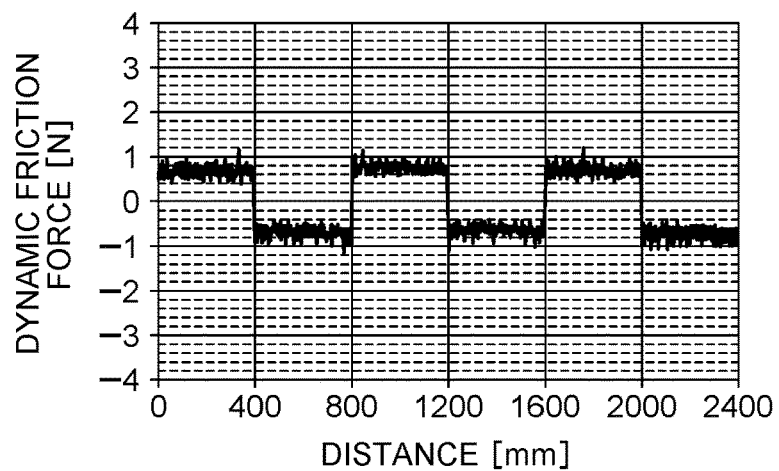
FIG. 5B is a view of the linear motion guide apparatus according to the second embodiment.
Figure 5C:
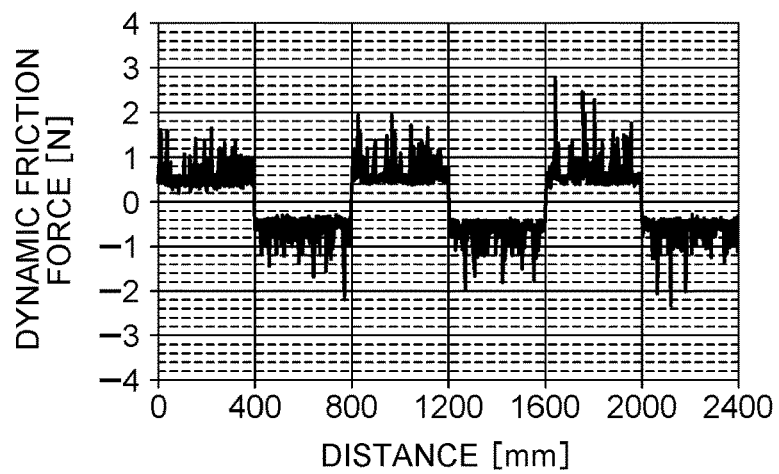
FIG. 5C is a graphic chart illustrating dynamic friction force generated when moving a slider by changing a direction per 400 mm in a conventional linear motion guide apparatus, i.e., in the apparatus configured to load only load balls into a guide path with respect to the linear motion guide apparatus according to the first embodiment.

Such being the case, the linear motion guide apparatus 20 according to the second embodiment is configured to load, as depicted in FIG. 5, the load balls 5*a* and the elastic balls 5*b* into the guide path G so that at least one elastic ball 5*b* is always positioned in the linear portion of the circulation path C, i.e., in the return path 3*b* of the slider body 3. Specifically, one elastic ball 5*b* is loaded for every six load balls 5*a* into the guide path G, thus disposing the three elastic balls 5*b* at the substantially equal intervals in the guide path G. With this arrangement, it follows that one elastic ball 5*b* always exists in the linear portion of the circulation path C during the running of the slider 2.

This configuration enables the linear motion guide apparatus 20 according to the second embodiment to exhibit the same effects as those in the first embodiment. In particular, the elastic ball 5*b* is always disposed in the linear portion of the circulation path C, whereby the direction of the aforementioned pressing force received by the elastic ball 5*b* is coincident with the advancing direction of the rolling body 5. With this arrangement, the elastic ball 5*b* receives application of the pressing force most efficiently to get deformed to a great degree, and is thereby enabled to absorb the pressing force more effectively. It is therefore feasible to preferably prevent the malfunction and the occurrence of the failure of the linear motion guide apparatus 20 by effectively restraining the abrupt generation of the frictional force and the fluctuations of the frictional force due to slippage of the load ball 5*a*. For what is described above, refer to FIG. 5B.

It is to be noted that the second embodiment demonstrates the linear motion guide apparatus 20 with one elastic ball 5*b* being always positioned in the linear portion of the circulation path C as described above. However, the linear motion guide apparatus may be configured to, without being limited to this configuration, include two or more elastic balls that are always positioned in the linear portion of the circulation path, corresponding to the number and other equivalent attributes of the load balls.

Note that the first and second embodiments demonstrate the linear motion guide apparatuses including the balls as the rolling bodies. However, the present invention is, without being limited to this configuration, also applicable to linear motion guide apparatuses including rollers as the rolling bodies. The present invention is further, without being limited to the linear motion guide apparatuses, applicable to curvilinear motion guide apparatuses each including a curvilinear guide rail.

Third Embodiment

Figure 6A:
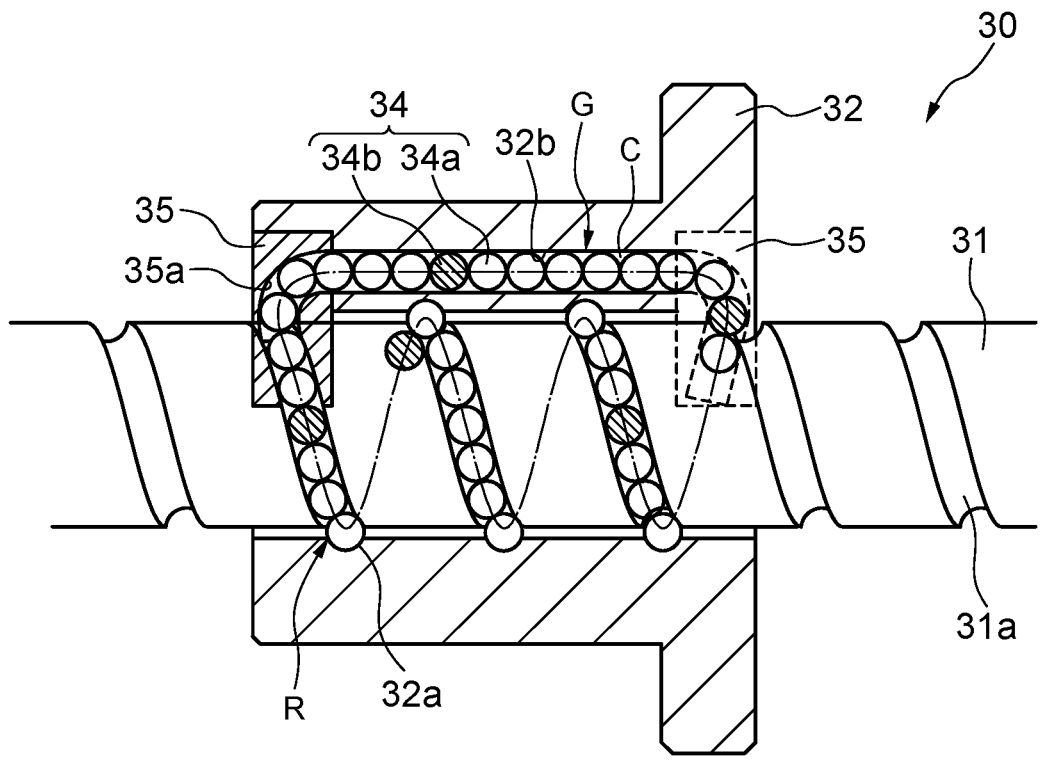
FIG. 6A is a view illustrating a ball screw apparatus defined as the rolling guide apparatus according to a third embodiment.

A ball screw apparatus 30 defined as the rolling guide apparatus according to a third embodiment illustrated in FIG. 6A is configured to include a screw shaft 31 and a nut 32 screwed to the screw shaft 31 via the rolling bodies 34.

The screw shaft 31 is composed of a metallic member taking an elongated circular cylindrical shape. A rolling groove 31a is helically formed along an outer peripheral surface of the screw shaft 31. The nut 32 is composed of a metallic member taking a substantially circular cylindrical shape and formed with a circular through-hole larger than an outside diameter of the screw shaft 31. An inner peripheral surface of the nut 32 is formed with a rolling groove 32a taking a helical shape corresponding to the rolling groove 31a of the screw shaft 31. The screw shaft 31 is inserted into the through-hole of the nut 32, and the rolling path R is configured in a way that sets their rolling grooves 31a, 32a in a face-to-face relationship with each other. The rolling bodies 34 to be mentioned later on are loaded into this rolling path R, whereby the nut 32 is screwed to the screw shaft 31.

Figure 6B:
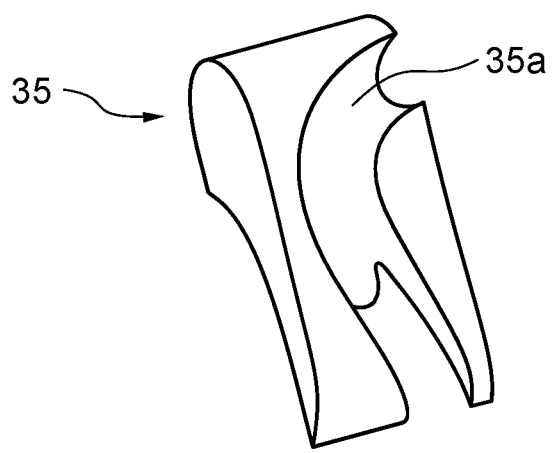
FIG. 6B is a view illustrating a configuration of end piece members.

The nut 32 is formed with a linear return path 32b penetrating in an axial direction. End piece members 35 are embedded in both end portions of the nut 32 in the axial direction. The end piece member 35 is composed of a resinous member taking a substantially triangular shape as illustrated in FIG. 6B, and is formed with a change-of-direction path 35a. The change-of-direction path 35a serves to allow the rolling path R and the return path 32b to communicate with each other as depicted in FIG. 6A, and takes a substantially a circular arc shape. Note that the end piece member 35 may also be composed of a metal without being limited to the resin. The return path 32b of the nut 32 and the change-of-direction path 35a of the end piece member 35 configure the circulation path C for circulating the rolling bodies 34 through the rolling path R. Note that the return path 32b of the nut 32 is also said to be a linear portion of the circulation path C, while the change-of-direction path 35a of the end piece member 35 is also said to be a curvilinear portion of the circulation path C.

The circulation path C and the rolling path R are in combination referred to as the guide path G. A multiplicity of load balls 34a and a plurality of elastic balls 34b are loaded as the rolling bodies 34 into the guide path G.

With the configuration described above, any one of the screw shaft 31 and the nut 32 is rotated, and the rolling bodies 34 are caused to roll along within the rolling path R, thereby enabling the other, i.e., the screw shaft 31 or the nut 32, to linearly move in the axial direction. Note that the rolling bodies 34 rolling along within the rolling path R are again guided to the rolling path R via the circulation path C, and are thus enabled to circulate through the rolling path R and the circulation path C.

Herein, the load ball 34a of the rolling body 34 receives the load due to the external load and the preload that are applied to the ball screw apparatus 30 in the rolling path R, and is composed of the spherical metallic member. The material of the load ball 34a may also be ceramic and other equivalent materials without being limited to the metal.

The elastic ball 34b of the rolling body 34 serves to absorb the force generated by the load balls 34a jostling against each other within the guide path G, and is composed of the resinous member taking the spherical shape. It may be sufficient that the material of the elastic ball 34b is the elastic material instanced by the rubber being softer and more elastically deformable than the load ball 34a. The diameter of the elastic ball 34b is designed to be slightly smaller than the diameter of the load ball 34a. This design enables the load ball 34a and the elastic ball 34b to smoothly roll along the guide path G.

In the ball screw apparatus 30 according to the third embodiment, the load balls 34a and the elastic ball 34b are loaded in the guide path G so that at least one elastic ball 34b is, as illustrated in FIG. 6A, always positioned in the linear portion of the circulation path C, i.e., in the return path 32b of the nut 32. To be specific, one elastic ball 34b is loaded for every seven or eight load balls 34a, thereby disposing the six elastic balls (partially unillustrated) 34b at equal intervals. With this arrangement, it follows that one elastic ball 34b always exists in the linear portion of the circulation path C during a relative movement of the nut 32 with respect to the screw shaft 31.

This configuration enables the ball screw apparatus 30 according to the third embodiment to exhibit the same effects as those in the second embodiment. It is to be noted that the third embodiment demonstrates the ball screw apparatus 30 with one elastic ball 34b being always positioned in the linear portion of the circulation path C as described above. However, the ball screw apparatus may be configured to, without being limited to this configuration, include two or more elastic balls that are always positioned in the linear portion of the circulation path, corresponding to the number and other equivalent attributes of the load balls.

The ball screw apparatus 30 according to the third embodiment is common to the second embodiment in terms of disposing at least one elastic ball 34b always in the linear portion of the circulation path C; and, however, without being limited to this configuration, such a configuration is of course attainable that at least one elastic ball 34b is always disposed in the circulation path C as in the first embodiment. The present invention is, without being limited to the ball screw apparatus 30 including the end piece members 35 as in the third embodiment, applicable to a ball screw apparatus including other circulation members, e.g., a return tube and a guide plate for circulating the rolling bodies 34.

According to each of the embodiments discussed above, it is feasible to attain the rolling guide apparatus that is easy to be assembled and capable of performing stable operations.

Herein, each of the elastic balls 5b, 34b used in the linear motion guide apparatuses 10, 20 according to the first and second embodiments and the ball screw apparatus 30 according to the third embodiment, is a simple spherical body having no ruggedness on the surface. Hence, the above-mentioned effects produced by the elastic balls 5b, 34b, i.e., the effects in restraining the abrupt generation of the frictional force, the fluctuations of the frictional force and occurrence of noises by obviating the jostling of the load balls 5a, 34a against each other within the guide path G, depend mainly on facilitation of the elastic deformations of the elastic balls 5b, 34b. The facilitation of the elastic deformations of the elastic balls 5b, 34b may be adjusted simply by changing a quality of the material; and, however, the quality of the material entails taking account of durability, abrasion resistance, oil resistance and other equivalent properties, and therefore has difficulty of being selected freely. Concretely, when elastic materials hard to cause the elastic deformation are used for the elastic balls 5b, 34b, the quantities of the deformations of the elastic balls 5b, 34b become insufficient, resulting in an apprehension of reducing the effects described above. Whereas when elastic materials facilitating the elastic deformation are used for the elastic balls 5b, 34b, the ball surfaces are softened, resulting in an apprehension of decreasing the durability and the abrasion resistance.

Such being the case, the linear motion guide apparatuses 10, 20 according to the first and second embodiments and the ball screw apparatus 30 according to the third embodiment may also involve using elastic balls 101-113 according to respective modified examples, which will hereinafter be discussed, in place of the elastic balls 5b, 34b. Note that the elastic balls 101-113 according to the respective modified examples will be described based on a case in which the elastic balls 5b, 34b in the embodiments discussed above are steel balls that are 4.76 mm in diameter by way of one example.

First Modified Example

Figure 7A:
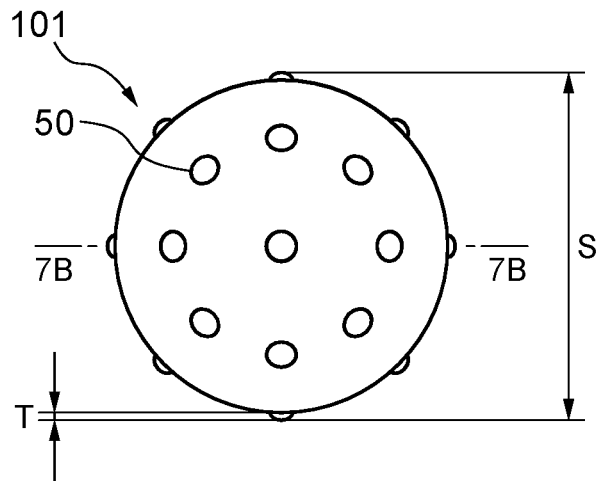
FIG. 7A is a top view illustrating a configuration of an elastic ball according to a first modified example.
Figure 7B:
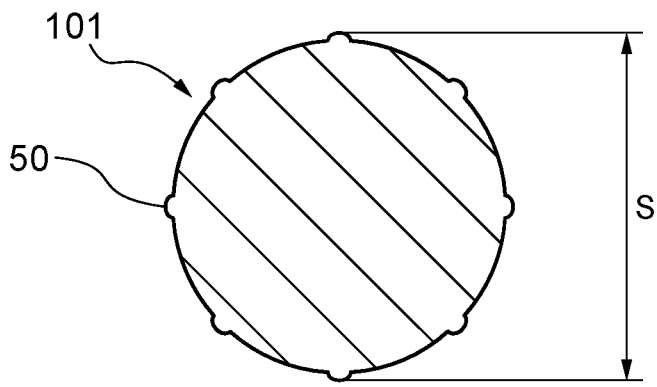
FIG. 7B is a sectional view taken along the line 7B-7B in FIG. 7A.

The elastic ball 101 according to a first modified example illustrated in FIGS. 7A and 7B is composed of a spherical resinous member, and includes a plurality of semi-spherical protrusions 50 formed integrally on the surface. It may be sufficient that a material of the elastic ball 101 is, similarly to the elastic ball 5b according to the first embodiment, an elastic material being softer and more elastically deformable than the load balls 5a, 34a, and the same is applied to respective modified examples given below. A height T of the protrusion 50 is preferably, e.g., 0.05-0.20 mm.

A maximum width S of the elastic ball 101, i.e., in the first modified example, a distance between a tip of an arbitrary protrusion 50 and a tip of another protrusion 50 that is opposite to the arbitrary protrusion 50 with respect to the center of the elastic ball 101, is slightly smaller than the diameter of each of the load balls 5a, 34a. For example, the maximum width S of the elastic ball 101 is smaller preferably by 0.02-0.20 mm than the diameter of each of the load balls 5a, 34a. The elastic ball 101 is thereby enabled to roll smoothly without being congested in the guide path G. Note that the plurality of protrusions 50 in the first modified example is arranged in a side-by-side relationship radially about the central protrusion 50 depicted in FIG. 7A, and may also be, without being limited to this arrangement, arranged at random on the surface of the elastic ball 101. The protrusion 50 may take, without being limited to the semi-spherical shape, other shapes instanced by a cubic shape.

Figure 7C:
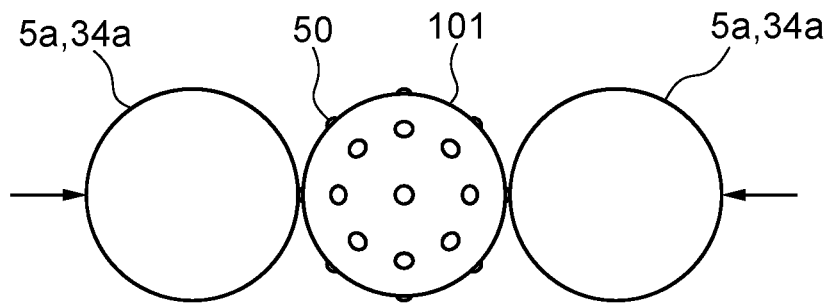
FIG. 7C is a view illustrating a state upon a contact between the elastic ball and the load ball within the guide path according to the first modified example.

The elastic ball 101 having such a configuration is applied to the first through third embodiments, thereby enabling the protrusion 50 of the elastic ball 101 to get elastically deformed locally upon a contact between the elastic ball 101 and each of the load balls 5a, 34a within the guide path G as illustrated in FIG. 7C. It is therefore feasible for the elastic ball 101 to ensure a larger quantity of deformation than the spherical elastic balls 5b, 35b each having no ruggedness on the surface, i.e., the elastic ball 101 is easier to get elastically deformed. Accordingly, it is possible to effectively restrain the abrupt generation of the frictional force, the fluctuations of the frictional force and the occurrence of the noises by further preferably obviating the jostling of the load balls 5a, 34a against each other within the guide path G. Note that the facilitation of the elastic deformation of the elastic ball 101 is easily adjustable by changing a size, a height, a number, a shape, a position and other equivalent items of the protrusion(s) 50.

Second Modified Example

Figure 8A:
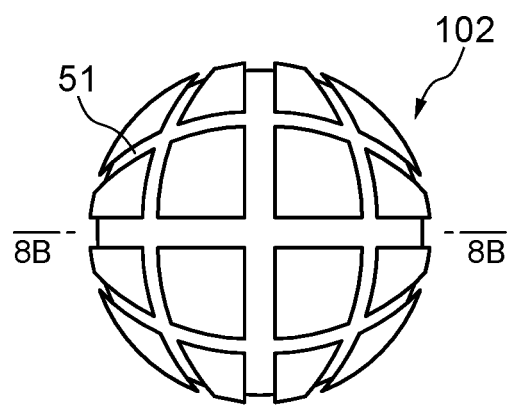
FIG. 8A is a front view illustrating a configuration of the elastic ball according to a second modified example.
Figure 8B:
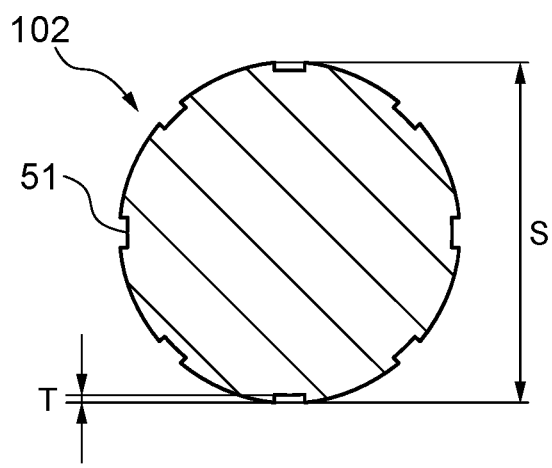
FIG. 8B is a sectional view taken along the line 8B-8B in FIG. 8A.

An elastic ball 102 according to a second modified example illustrated in FIGS. 8A and 8B is composed of a spherical resinous member, and includes plural lines of grooves 51 formed on its surface and taking a rectangular shape in section. The groove 51 extends round the surface of the elastic ball 102, and a depth T of this groove is preferably, e.g., 0.05-0.20 mm. Note that the sectional shape of the groove 51 may take, without being limited to the rectangular shape, a semi-circular shape and other equivalent shapes. The maximum width S of the elastic ball 102 such as this is the same as the maximum width S of the elastic ball 101 according to the first modified example.

Figure 8C:
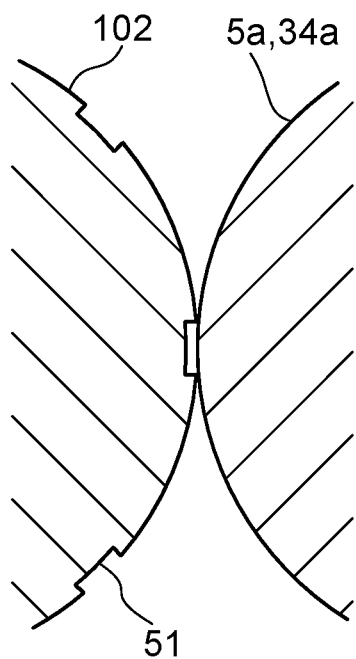
FIG. 8C is a view illustrating a state upon the contact between the elastic ball and the load ball within the guide path according to the second modified example.
Figure 8D:
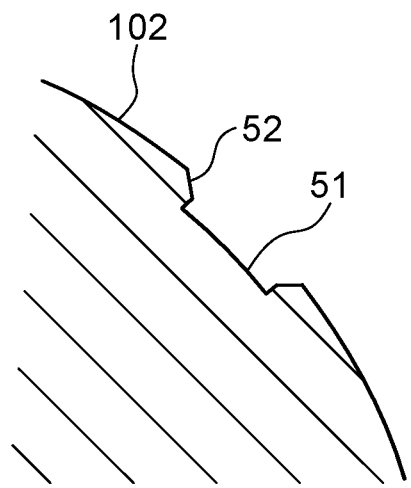
FIG. 8D is a partially enlarged view of FIG. 8C.

The elastic ball 102 such as this according to the second modified example is applied to the first through third embodiments, thereby enabling a shoulder portion 51a of the groove 51 of the elastic ball 102 to get elastically deformed locally upon a contact between the elastic ball 102 and each of the load balls 5a, 34a within the guide path G as illustrated in FIG. 8C. Consequently, the elastic ball 102 is easier to attain the elastic deformation than the spherical elastic balls 5b, 34b having no ruggedness on the surface, and can exhibit the same effects as those of the elastic ball 101 according to the first modified example. Note that the facilitation of the elastic deformation of the elastic ball 102 is easily adjustable by changing a size, a depth, a number, a shape, a position and other equivalent items of the groove(s) 51 and also by providing a chamfer 52 at the shoulder portion 51a of the groove 51 as illustrated in FIG. 8D and changing a size of this chamfer 52.

Third Modified Example

Figure 9:
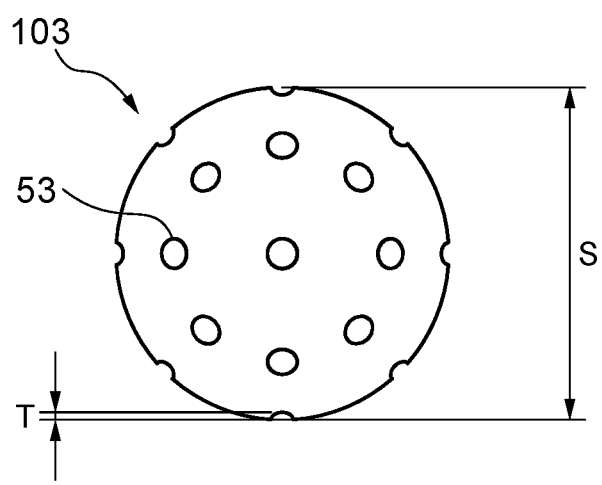
FIG. 9 is a top view illustrating a configuration of the elastic ball according to a third modified example.

An elastic ball 103 according to a third modified depicted in FIG. 9 is composed of a spherical resinous member and is provided with a semi-spherical hole 53 in place of the protrusion 50 of the elastic ball 101 according to the first modified example. The depth T of the hole 53 and the maximum width S of the elastic ball 103 are the same as the depth T of the groove 51 and the maximum width S of the elastic ball 102 according to the second modified example. It is to be noted that the plurality of holes 53 in the third modified example is arranged in the side-by-side relationship radially about the central hole 53 of the elastic ball 103 illustrated in FIG. 9, and may also be, without being limited to this arrangement, arranged at random on the surface of the elastic ball 103. The hole 53 may take, without being limited to the semi-spherical shape, other shapes instanced by the cubic shape.

The elastic ball 103 such as this according to the third modified example is applied to the first through third embodiments, and it is thereby feasible to exhibit the same effects as those of the elastic ball 102 according to the second modified example. Note that the facilitation of the elastic deformation of the elastic ball 103 is easily adjustable by changing a size, a depth, a number, a shape, a position and other equivalent items of the hole(s) 53 and also by, similarly to the second modified example, providing a chamfer at a shoulder portion of the hole 53 and changing a size of this chamfer.

Fourth Modified Example

Figure 10A:
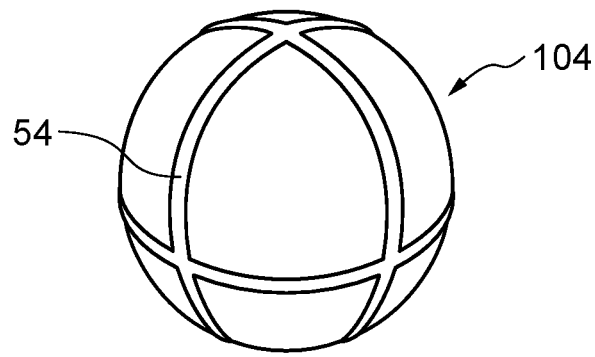
FIG. 10A is an external view illustrating a configuration of the elastic ball according to a fourth modified example.
Figure 10B:
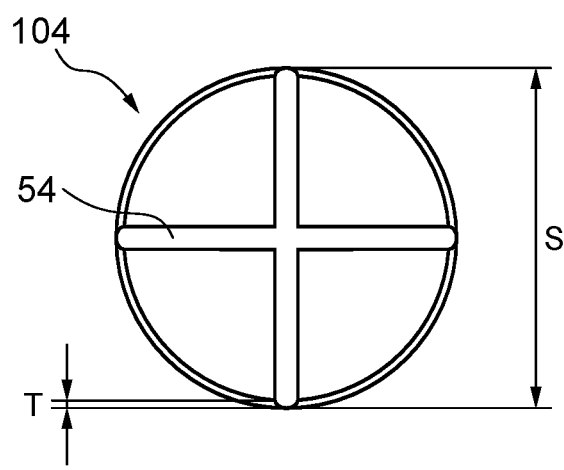
FIG. 10B is a front view of FIG. 10A.

An elastic ball 104 according to a fourth modified example illustrated in FIGS. 10A and 10B is composed of a spherical resinous member, and is provided integrally with three protruded streaks 54 vertically intersecting each other on the surface. The protruded streak 54 takes a semi-cylindrical shape and extends round the surface of the elastic ball 104. A height T of the protruded streak 54 is preferably 0.01-0.20 mm. The protruded streak 54 may also take, without being limited to the semi-cylindrical shape, a triangular pole shape, a square pole shape and other equivalent shapes. A maximum width S of the elastic ball 104, i.e., in the fourth modified example, a distance between a tip of the protruded streak 54 and a tip of another protruded streak 54 in a face-to-face relationship with the former protruded streak 54 via a center of the elastic ball 104, is the same as the maximum width S of the elastic ball 101 according to the first modified example.

The elastic ball 104 such as this is applied to the first through third embodiments, and it is thereby feasible to exhibit the same effects as those of the elastic ball 101 according to the first modified example. Note that the facilitation of the elastic deformation of the elastic ball 104 is easily adjustable by changing a size, a height, a number, a shape, a position and other equivalent items of the protruded streak(s) 54.

Figure 11A:
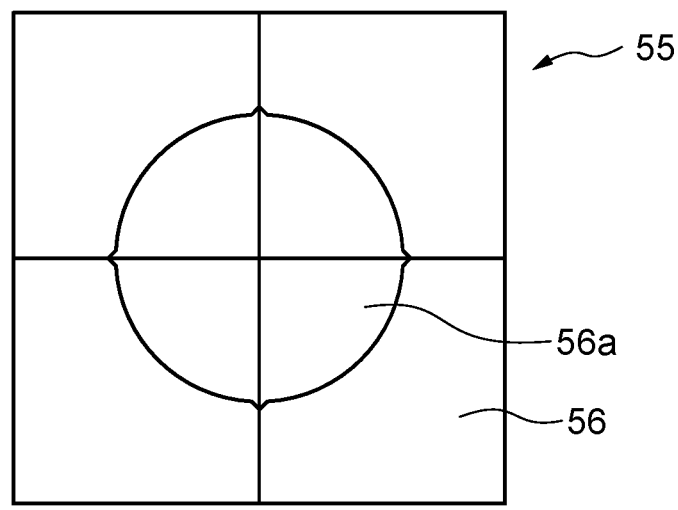
FIG. 11A is a view illustrating a configuration of a die assembly for molding the elastic ball according to a fourth modified example.
Figure 11B:
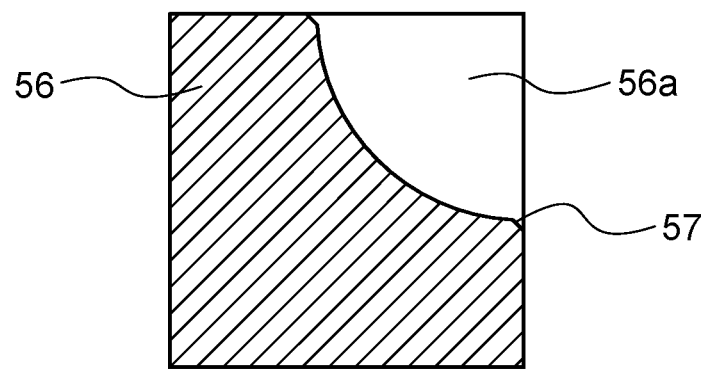
FIG. 11B is a sectional view of die assembly parts that assemble the die assembly.

Herein, the elastic ball 104 according to the fourth modified example is manufactured from the elastic material such as the resin by using a die assembly 55 depicted in FIG. 11A. The die assembly 55 is assembled from eight die parts 56, of which the four die parts 56 illustrated in FIG. 11A are disposed in the face-to-face relationship with another same four die parts 56 (unillustrated). The die part 56 is composed of a metallic member taking a cubic shape as illustrated in section in FIG. 11B, and is provided with a ball molding surface 56a formed by hollowing one angular portion in a ⅛ shape of the spherical body. An end portion of the ball molding surface 56a of the die part 56 is provided with a chamfer 57 for molding the protruded streak 54 of the elastic ball 104. Use of the die assembly 55 having such a configuration enables the elastic ball 104 to be easily molded. Particularly, a size and a shape of the protruded streak 54 is easily adjustable by changing a size and other equivalent items of the chamfer 57 of the die part 56.

Fifth Modified Example

Figure 12A:
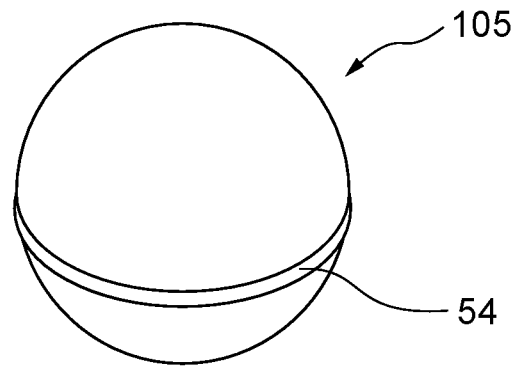
FIG. 12A is an external view illustrating a configuration of an elastic ball according to a fifth modified example.

An elastic ball 105 according to a fifth modified example illustrated in FIG. 12A is configured to include only one protruded streak 54 of the elastic ball 104 according to the fourth modified example. The elastic ball 105 such as this is applied to the first through third embodiments, whereby the same effects as those of the elastic ball 101 according to the first modified example can be exhibited.

Figure 12B:
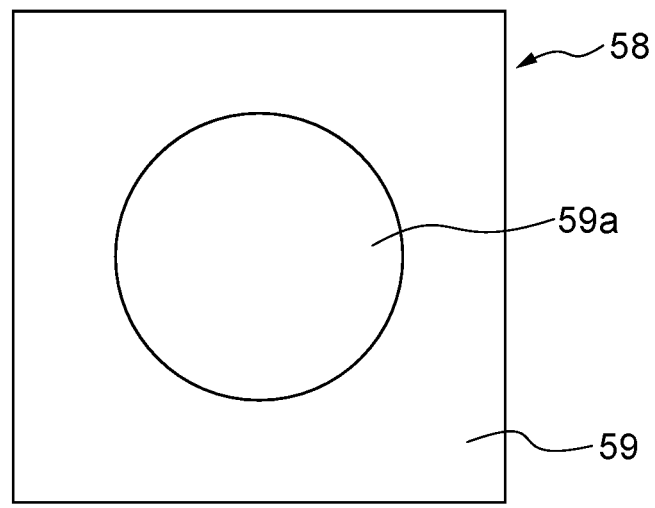
FIG. 12B is a sectional view of die assembly parts that assemble the die assembly for molding the elastic ball.
Figure 12C:
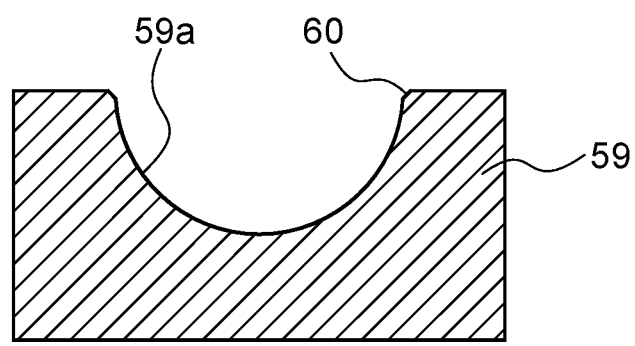
FIG. 12C is a sectional view of the die assembly parts assembling the die assembly.

Herein, the elastic ball 105 according to the fifth modified example is manufactured from the elastic material such as the resin by using a die assembly 58 depicted in FIG. 12B. The die assembly 58 is assembled from two die parts 59, of which the die part 59 illustrated in FIG. 12B is disposed in the face-to-face relationship with another same die part 59 (unillustrated). The die part 59 is composed of a metallic member taking a cubic shape as illustrated in section in FIG. 12C, and is provided with a ball molding surface 59a formed by hollowing one surface of this metallic member in a semi-spherical shape. An end portion of the ball molding surface 59a of the die part 59 is provided with a chamfer 60 for molding the protruded streak 54 of the elastic ball 105. The die assembly 58 having such a configuration can exhibit the same effects as those of the die assembly 55 according to the fourth modified example. In particular, the fifth modified example uses only the two die parts 59, thereby further facilitating the manufacturing of the elastic ball 105.

Sixth Modified Example

Figure 13:
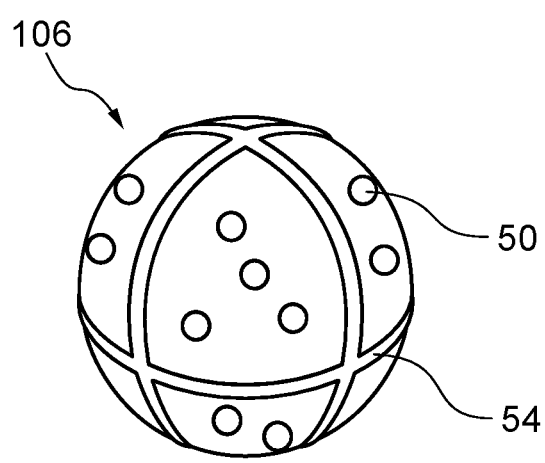
FIG. 13 is an external view illustrating a configuration of the elastic ball according to a sixth modified example.

An elastic ball 106 according to sixth modified example illustrated in FIG. 13A is configured by disposing a plurality of protrusions 50 of the elastic ball 101 according to the first modified example on the elastic ball 104 according to the fourth modified example. The elastic ball 106 such as this is applied to the first through third embodiments, whereby the same effects as those of the elastic ball 101 according to the first modified example can be further preferably exhibited. Especially the facilitation of the elastic deformation of the elastic ball 106 is easily adjustable not only by changing the size and the shape of the protruded streak 54 but also by changing a size, a height, a number, a shape, a position and other equivalent items of the protrusion(s) 50. Therefore, the facilitation of the elastic ball 106 is further finely adjustable.

Seventh Modified Example

Figure 14A:
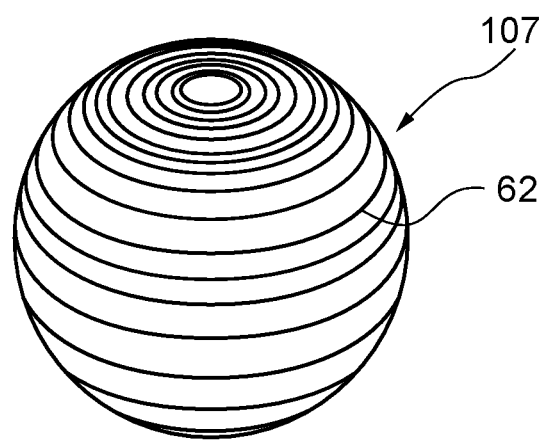
FIG. 14A is an external view illustrating a configuration of the elastic ball according to a seventh modified example.
Figure 14B:
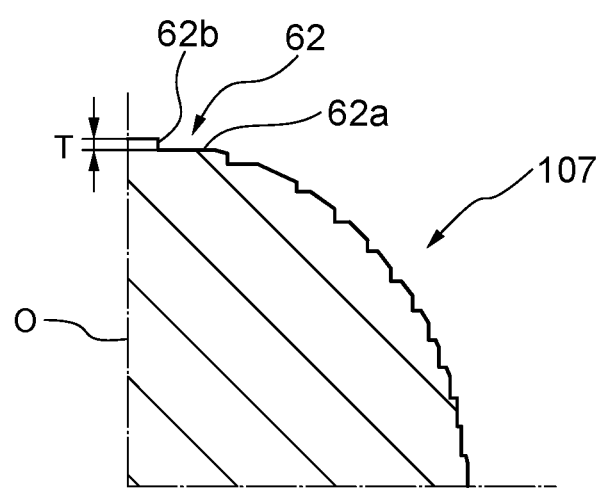
FIG. 14B is a partially sectional view of the elastic ball.

An elastic ball 107 according to a seventh modified example illustrated in FIGS. 14A and 14B is composed of a spherical resinous member, and includes a multiplicity of grooves 62 formed in the surface. Each of the multiplicity of grooves 62 is concentric with a central axis O of the elastic ball 107, and extends round the surface of the elastic ball 107. As depicted in FIG. 14B, the groove 62 is configured to include a flat portion 62a vertical to the central axis O and a wall face portion 62b parallel with the central axis O. A depth T of the groove 62 is preferably, e.g., 0.01-0.10 mm. Intervals between the respective grooves 62 are preferably, e.g., 0.05-2.00 mm. A maximum width S of the elastic ball 107 is the same as the maximum width S of the elastic ball 102 according to the second modified example. Note that the grooves 62 are not limited to the configuration described above.

The elastic ball 107 such as this is applied to the first through third embodiments, whereby the same effects as those of the elastic ball 102 according to the second modified example can be exhibited. Note that the facilitation of the elastic deformation of the elastic ball 107 is easily adjustable by changing a size, a depth, a number, a shape, an interval and other equivalent items of the groove(s) 62.

Eighth Modified Example

Figure 15A:
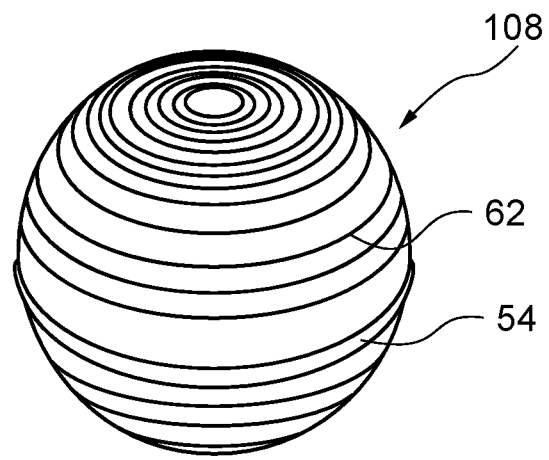
FIG. 15A is an external view illustrating a configuration of the elastic ball according to an eighth modified example.
Figure 15B:
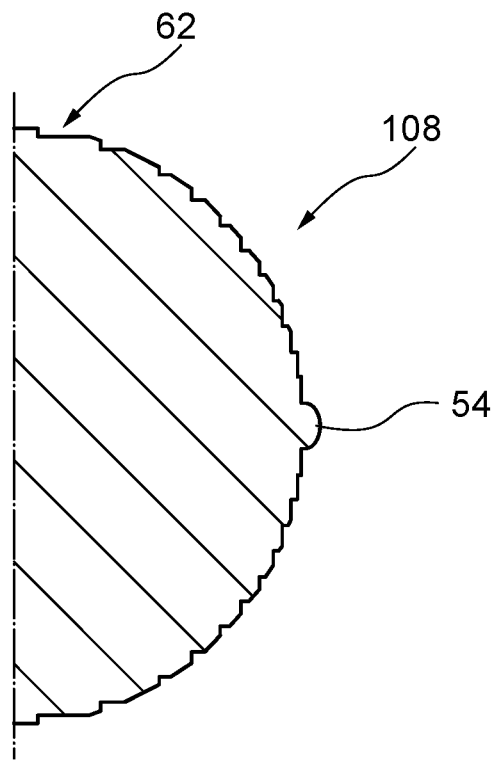
FIG. 15B is a partially sectional view of the elastic ball.

An elastic ball 108 according to an eighth modified example illustrated in FIGS. 15A and 15B is configured to include a multiplicity of grooves 62, formed in the elastic ball 105 according to the fifth modified example, of the elastic ball 107 according to the seventh modified example. The elastic ball 108 such as this is applied to the first through third embodiments, whereby the same effects as those of the elastic ball 105 according to the fifth modified example can be further preferably exhibited. Especially in the eighth modified example, the facilitation of the elastic deformation of the elastic ball 108 is easily adjustable not only by changing the size and the shape of the protruded streak 54 but also by changing a size, a depth, a number, a shape, an interval and other equivalent items of the groove(s) 62. Therefore, the facilitation of the elastic ball 108 is further finely adjustable.

Ninth Modified Example

Figure 16A:
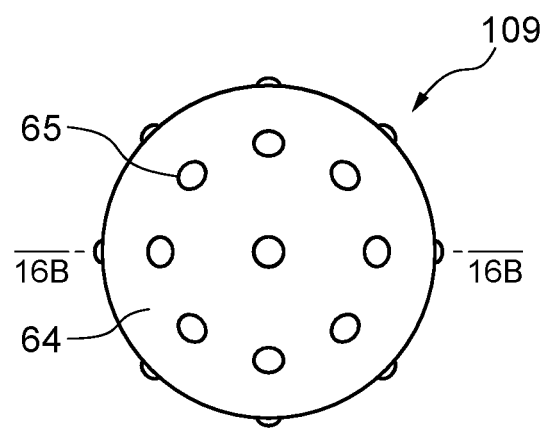
FIG. 16A is a top view illustrating a configuration of the elastic ball according to a ninth modified example.
Figure 16B:
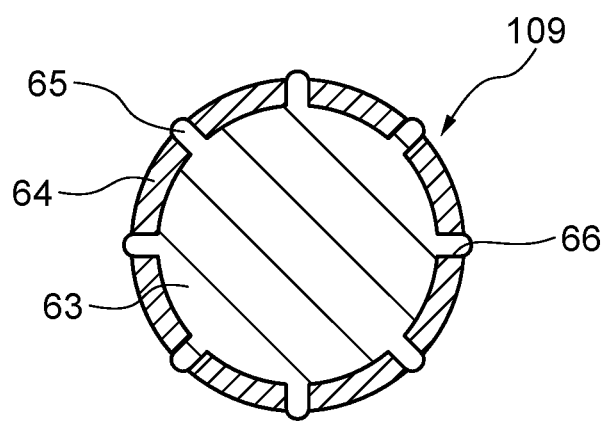
FIG. 16B is a sectional view taken along the line 16B-16B in FIG. 16A.

An elastic ball 109 according to a ninth modified example illustrated in FIGS. 16A and 16B has substantially the same external shape as that of the elastic ball 101 according to the first modified example, and is configured to include a ball body unit 63 and a cover unit 64 covering, without any gap, a surface of the ball body unit 63. The ball body unit 63 is composed of a spherical resinous member. The surface of the ball body unit 63 is integrally provided with protrusions 65 in the same positions as those of the protrusions 50 of the elastic ball 101 according to the first modified example. The protrusion 65 takes a cylindrical shape extending outward in radial directions of the ball body unit 63, and a tip of the protrusion 65 has a semi-spherical shape. The ball body unit 63 such as this involves using a first elastic material that is the same as the material of the elastic ball 101 according to the first modified example.

The cover unit 64 is composed of a spherical hollowed resinous member. The cover unit 64 is formed with circular through-holes 66 into which the protrusions 65 are fittable in positions each having a face-to-face relationship with each of the protrusions of the ball body unit 63. The semi-spherical portions of the protrusions 65 of the ball body unit 63 are thereby exposable to outside from the through-holes 66. A second elastic material harder than the first elastic material is used as a material of the cover unit 64 such as this. It is preferable that the second elastic material involves adopting a rubber material having higher hardness than the first elastic material, or plastics (polyamide, polyacetal, a variety of elastomers). Note that it is actually preferable to mold the cover unit 64 around the ball body unit 63 by using the ball body unit 63 as a core after molding the ball body unit 63 by employing a predetermined die assembly. It is also preferable that a height of the semi-spherical portion of the protrusion 65 exposed from the through-hole 66 of the cover unit 64 and a maximum width of the elastic ball 109 are set the same as those of the elastic ball 101 according to the first modified example.

The elastic ball 109 such as this is applied to the first through third embodiments, whereby the same effects as those of the elastic ball 101 according to the first modified example can be exhibited. Especially, in the ninth modified example, the hard cover unit 64 can improve the durability and the oil resistance. Note that the facilitation of the elastic deformation of the elastic ball 109 is easily adjustable by changing a size, a height, a number, a shape, a position and other equivalent items of the protrusion(s) 65, and changing the through-hole 66 of the cover unit 64, corresponding to these changes.

Tenth Modified Example

Figure 17A:
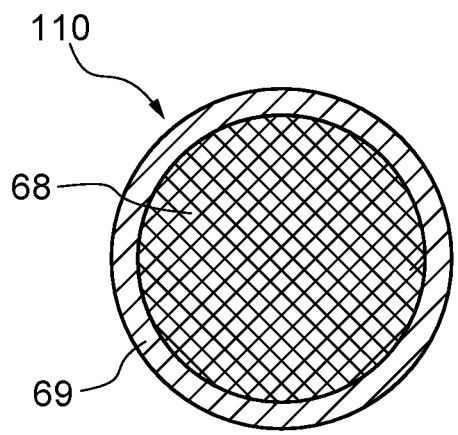
FIGS. 17A-17D are sectional views illustrating configurations of the elastic balls according to tenth through thirteenth modified examples.

An elastic ball 110 according to a tenth modified example depicted in FIG. 17A is configured to include a ball body unit 68 and a cover unit 69 covering, without any gap, a surface of the ball body unit 68. The ball body unit 68 is composed of a spherical resinous member having no ruggedness on the surface. The second elastic material described in the ninth modified example is used as a material of the ball body unit 68. Note that the second elastic material may involve adopting plastics, metals, ceramic and other equivalent materials. The cover unit 69 is composed of a spherical and hollowed resinous member having no ruggedness on the surface. The first elastic material described in the ninth modified example is employed as a material of the cover unit 69. A thickness, i.e., a wall thickness of the cover unit 69 is preferably, e.g., 0.50-2.00 mm. It is preferable that a diameter of the elastic ball 110 having such a configuration is set the same as the maximum width S of the elastic ball 102 according to the second modified example.

The elastic ball 110 such as this is applied to the first through third embodiments, whereby the same effects as those of the elastic ball 101 according to the first modified example can be exhibited. Note that the facilitation of the elastic deformation of the elastic ball 110 is easily adjustable by changing the thickness of the cover unit 69.

Eleventh Modified Example

Figure 17B:
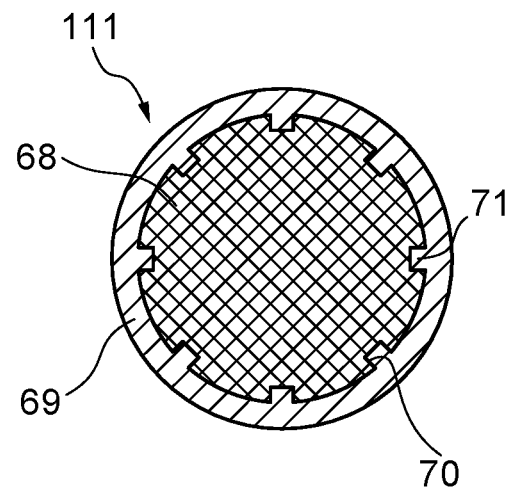

An elastic ball 111 according to an eleventh modified example illustrated in FIG. 17B is an improvement of the elastic ball 110 according to the tenth modified example. The elastic ball 111 is provided with recessed portions 70 each taking a circular cylindrical shape, which are formed in the same positions, as those of the protrusions 50 of the elastic ball 101 according to the first modified example, of the surface of the ball body unit 68. Internal circular cylindrical protrusions 71 extending inward in the radial directions and being fittable into the recessed portions 70, are provided in positions, having the face-to-face relationship with the recessed portions 70 of the ball body unit 68, of an internal surface of the cover unit 69. In other words, the portion provided with the internal protrusion 71 of the cover unit 69 becomes large in thickness.

The elastic ball 111 having such a configuration is applied to the first through third embodiments, whereby the same effects as those of the elastic ball 110 according to the tenth modified example can be exhibited. Particularly, in the elastic ball 111 according to the eleventh modified example, the portion provided with the internal protrusion 71 of the cover unit 69 is easy to locally get elastically deformed, whereby the effects described above can be exhibited more preferably. Note that the facilitation of the elastic deformation of the elastic ball 111 is easily adjustable not only by changing the thickness of the cover unit 69 but also by changing a size, a depth, a number, a shape, a position and other equivalent items of the recessed portion(s) 70 and further changing the internal protrusion 71 of the cover unit 69, corresponding to these changes. Therefore, the facilitation of the elastic ball 111 is further finely adjustable.

Twelfth Modified Example

Figure 17C:
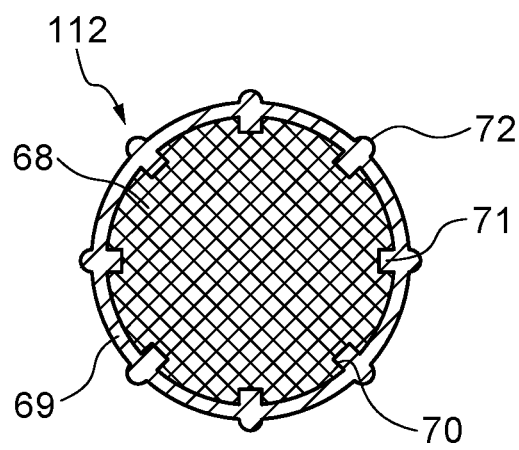

An elastic ball 112 according to a twelfth modified example illustrated in FIG. 17C is an improvement of the elastic ball 111 according to the eleventh modified example, and takes the same external appearance as that of the elastic ball 101 according to the first modified example. The elastic ball 112 according to the twelfth modified example is integrally provided with semi-spherical protrusions 72, which are formed in positions, having the face-to-face relationship with the internal protrusions 71, of the surface of the cover unit 69. Note that a height of the protrusion 72 and a maximum width of the elastic ball 112 are set preferably the same as those of the elastic ball 101 according to the first modified example.

The elastic ball 112 having such a configuration is applied to the first through third embodiments, whereby the same effects as those of the elastic ball 111 according to the eleventh modified example can be exhibited. Particularly, in the elastic ball 112 according to the twelfth modified example, the protrusion 72 of the cover unit 69 is easy to locally get elastically deformed, whereby the effects described above can be exhibited more preferably. Note that the facilitation of the elastic deformation of the elastic ball 112 is easily adjustable not only by changing the thickness of the cover unit 69, changing the size, the depth, the number, the shape, the position and other equivalent items of the recessed portion(s) 70 and changing the internal protrusion 71 of the cover unit 69 corresponding to these changes but also by changing a size, a height, a number, a shape, a position and other equivalent items of the protrusion(s) 72. Therefore, the facilitation of the elastic ball 112 is further finely adjustable.

Thirteenth Modified Example

Figure 17D:
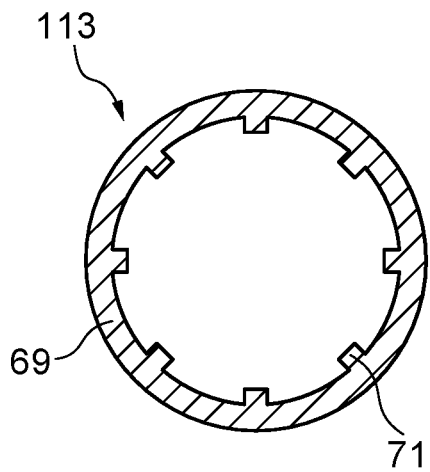

An elastic ball 113 according to a thirteenth modified example illustrated in FIG. 17D is configured to include only the cover unit 69 by eliminating the ball body unit 68 with respect to the elastic ball 111 according to the eleventh modified example. The elastic ball 113 such as this is applied to the first through third embodiments, whereby the same effects as those of the elastic ball 111 according to the eleventh modified example can be exhibited. The facilitation of the elastic deformation of the elastic ball 113 is easily adjustable by changing the thickness of the cover unit 69 and changing the size, the height, the number, the shape, the position and other equivalent items of the internal protrusion(s) 71. It is to be noted that the surface of the cover unit 69 in the thirteenth modified example may be integrally provided with the protrusions 72 in the same way as the elastic ball 112 according to the twelfth modified example.

According to the respective modified examples, it is feasible to attain the elastic balls 101-113 that are easy to get elastically deformed. The elastic materials unsuitable for the elastic balls 5b, 34b in the first through third embodiments due to being hard though high in durability, abrasion resistance, oil resistance and other equivalent resistances can be therefore adopted for the elastic balls 101-113 according to the respective modified examples, thereby tremendously improving a degree of freedom in design. With this configuration, when applied to the first through third embodiments, it is feasible to preferably obviate the jostling of the load balls 5a, 34a against each other within the guide path G, to effectively restrain the abrupt generation of the frictional force, the fluctuations of the frictional force and the occurrence of the noises, and to attain the elastic balls 101-113 that are excellent in durability, abrasion resistance and oil resistance.

The facilitation of the elastic deformation of each of the elastic balls 101-113 according to the respective modified examples is easily adjustable by, as described above, changing the sizes, the numbers, the shapes and the positions of the protrusions 50, 65, 72, the grooves, 51, 62, the holes 53, the protruded streaks 54 and the internal protrusions 71. It is therefore possible to attain the elastic balls 101-113 that accomplish, with a most preferable balance, effectively restraining the abrupt generation of the frictional force, the fluctuations of the frictional force and the occurrence of the noises, and sufficiently ensuring the durability, the abrasion resistance and the oil resistance.

What is claimed is:

1. A rolling guide apparatus having a first member, a second member, and a rolling body unit being disposed between the first member and the second member, the second member being movable along the first member upon rolling of the rolling body unit, the apparatus comprising:
    a rolling body unit guide path being configured to include:
        a rolling path being configured to have a rolling groove formed in the first member, and a rolling groove formed in the second member in a face-to-face relationship with the rolling groove of the first member; and
        a circulation path being provided in the second member and allowing communication between a start point and an end point of the rolling path,
    the rolling body unit being configured to include a plurality of first rolling bodies each configured to receive an external load, and a plurality of second rolling bodies each composed of an elastic material,
    each first rolling body and second rolling body having a spherical shape and an outer surface,
    the second rolling body having, on the outer surface thereof, a deforming unit configured to elastically deform upon contact with the first rolling body,
    the deforming unit including at least one integral streak provided so as to protrude from the outer surface of the second rolling body,
    a distance between a first tip of the protruded streak and a second tip of the protruded streak that is opposite to the first tip with respect to a center of the second rolling body being smaller than a diameter of the first rolling body, and
    at least one second rolling body being always positioned in the circulation path.

2. The rolling guide apparatus according to claim 1, wherein the circulation path is configured to include a linear portion taking a linear shape and a curvilinear portion taking a curvilinear shape, and
    at least one second rolling body is always positioned in the linear portion of the circulation path.

3. The rolling guide apparatus according to claim 1, wherein intervals between the second rolling bodies along the guide path are substantially equal.

4. The rolling guide apparatus according to claim 1, wherein the second rolling body is smaller in diameter than the first rolling body.

5. The rolling guide apparatus according to claim 1, wherein the first rolling body is composed of a metallic material or ceramic being harder than the second rolling body.

6. The rolling guide apparatus according to claim 1, wherein the first member is configured to include a guide rail, and
    the second member includes a slider body and an end cap.

7. The rolling guide apparatus according to claim 6, wherein the circulation path is configured to include a linear return path formed in the slider body and a curvilinear change-of-direction path formed in the end cap, and
    at least one second rolling body is always positioned in the return path.

8. The rolling guide apparatus according to claim 1, wherein the first member is configured to include a screw shaft, and
    the second member includes a nut and a circulation member to circulate the rolling body unit.

9. The rolling guide apparatus according to claim 8, wherein the circulation member is configured to include end piece members embedded into the nut,
    the circulation path is configured to include a linear return path formed in the nut and a curvilinear change-of-direction path formed in the end piece members, and
    at least one second rolling body is always positioned in the return path.

10. The rolling guide apparatus according to claim 1, wherein the deforming unit includes a plurality of protrusions being provided integrally on the outer surface of the second rolling body.

11. The rolling guide apparatus according to claim 1, wherein the deforming unit includes at least one line of a groove being formed in the outer surface of the second rolling body.

12. The rolling guide apparatus according to claim 1, wherein the deforming unit includes a plurality of grooves being formed in the outer surface of the second rolling body and being concentric with a central axis of the second rolling body.

* * * * *